May 10, 1932.  W. P. PINCKARD  1,857,740
AUTOMATIC TRAILER TRAIN STEERING MECHANISM
Filed March 4, 1931  10 Sheets-Sheet 1

Inventor
William P. Pinckard
By Clarence A. O'Brien
Attorney

May 10, 1932. W. P. PINCKARD 1,857,740
AUTOMATIC TRAILER TRAIN STEERING MECHANISM
Filed March 4, 1931 10 Sheets-Sheet 3

Fig. 3.

Inventor
William P. Pinckard
By Clarence A. O'Brien
Attorney

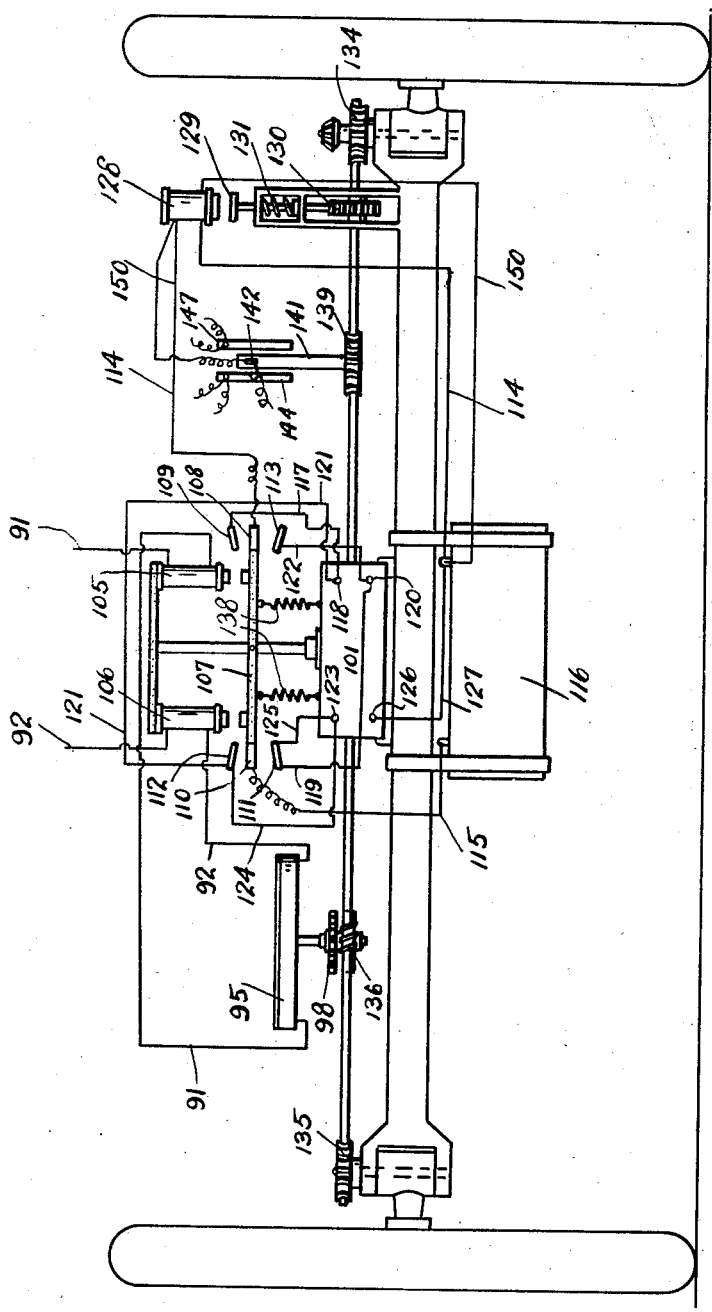

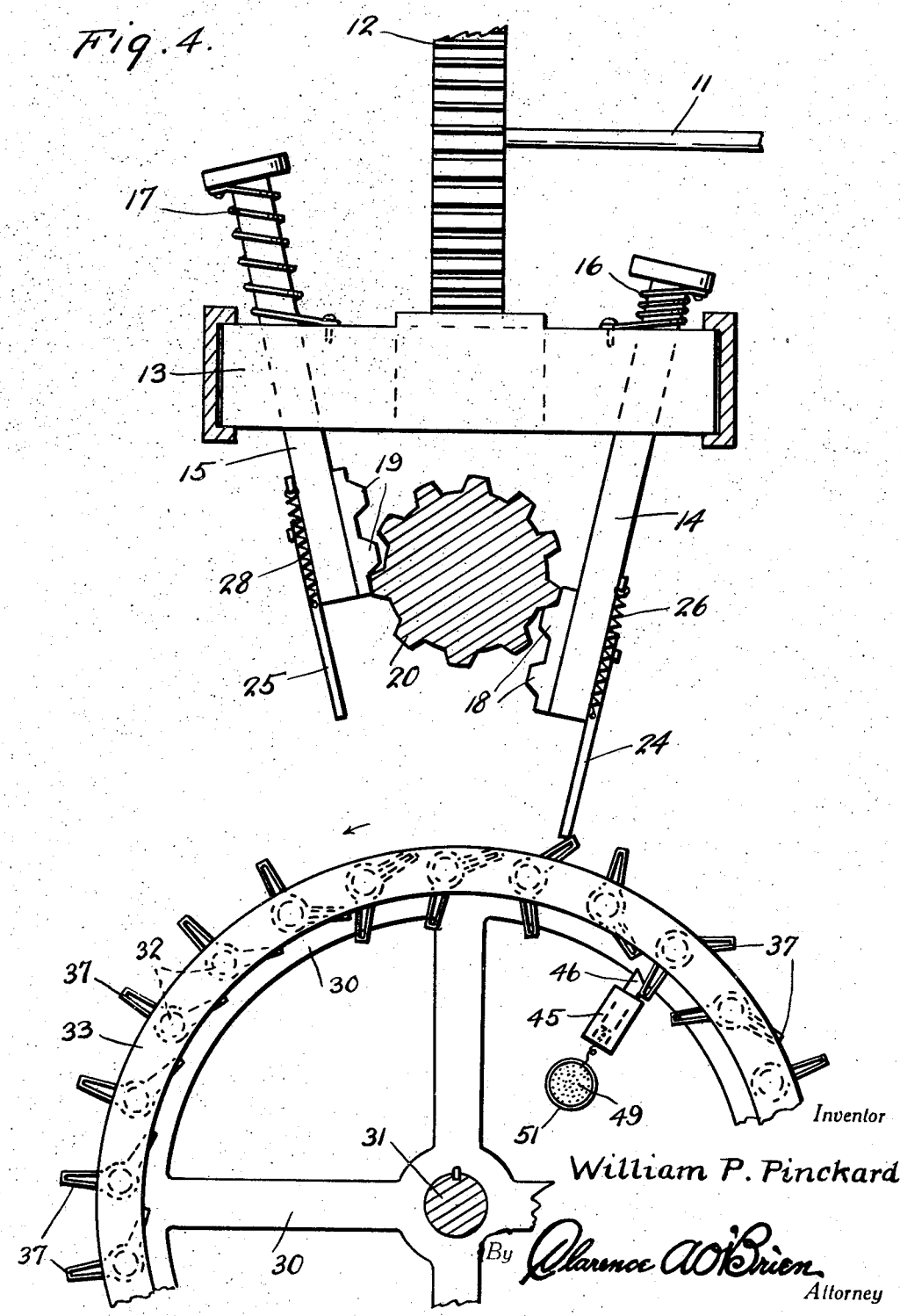

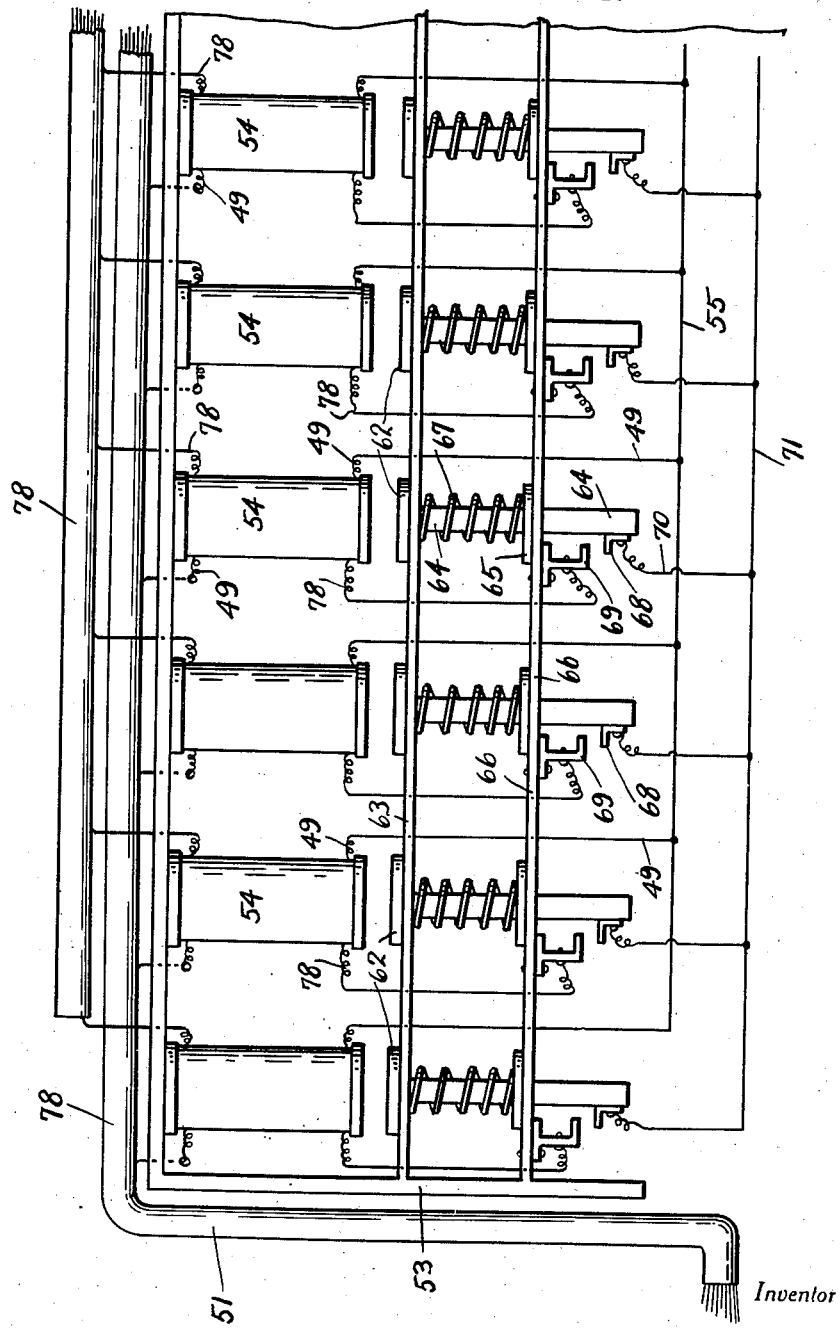

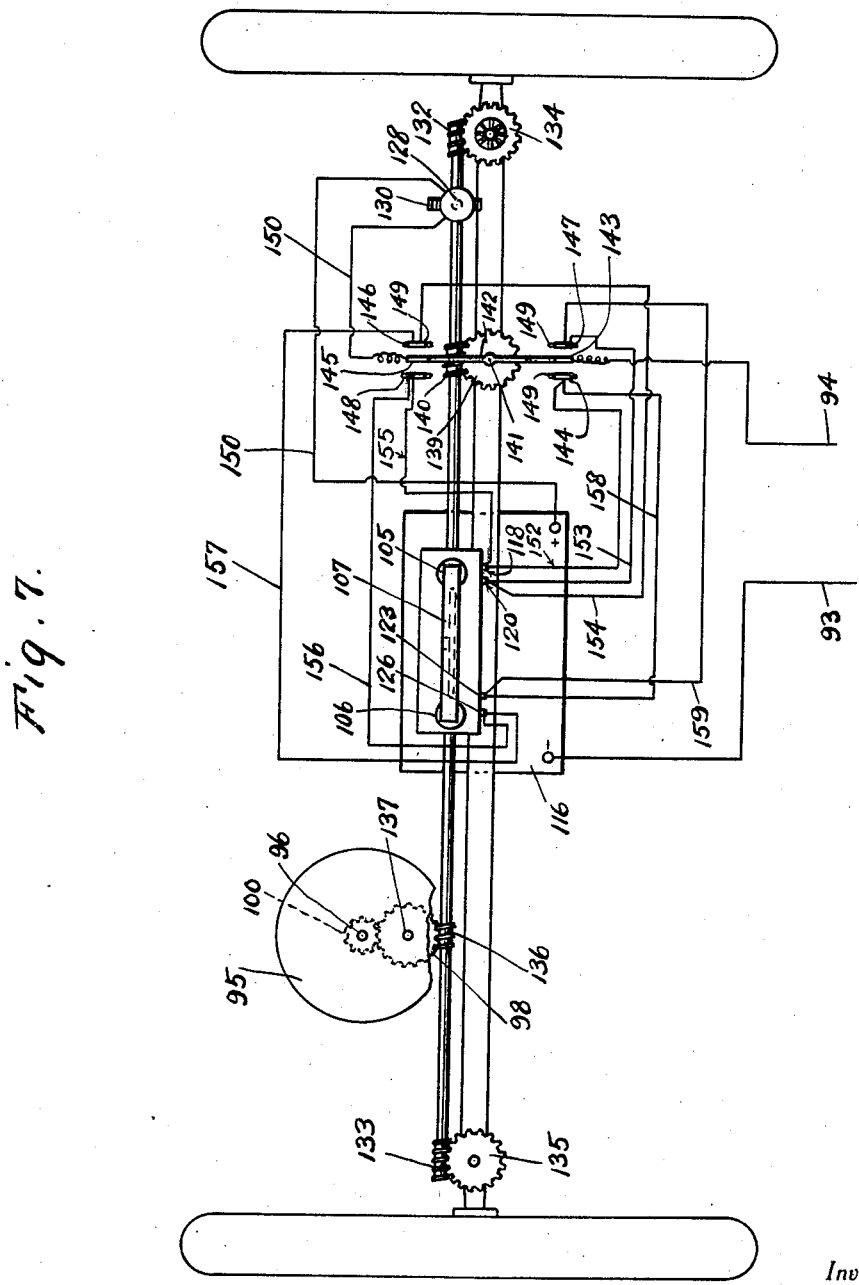

May 10, 1932.  W. P. PINCKARD  1,857,740
AUTOMATIC TRAILER TRAIN STEERING MECHANISM
Filed March 4, 1931  10 Sheets-Sheet 8
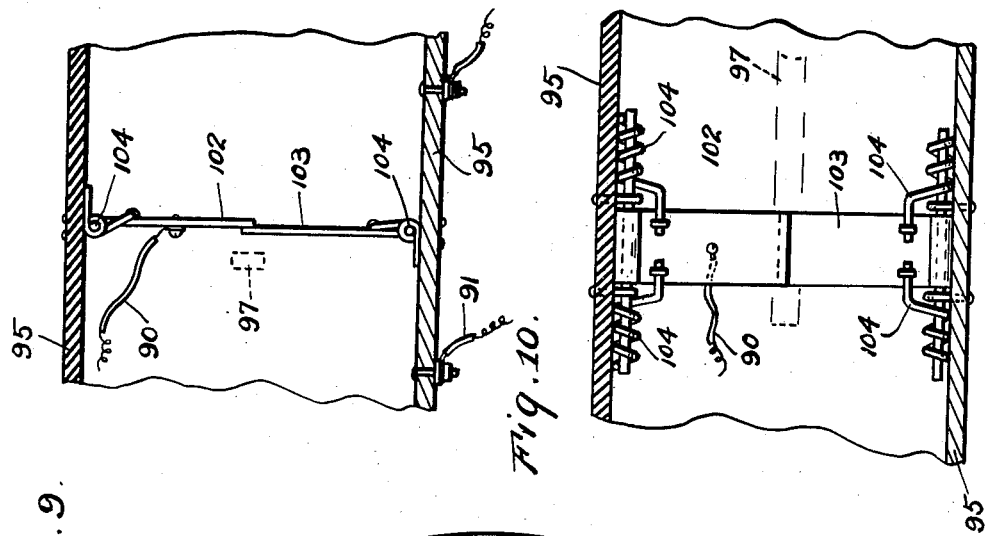
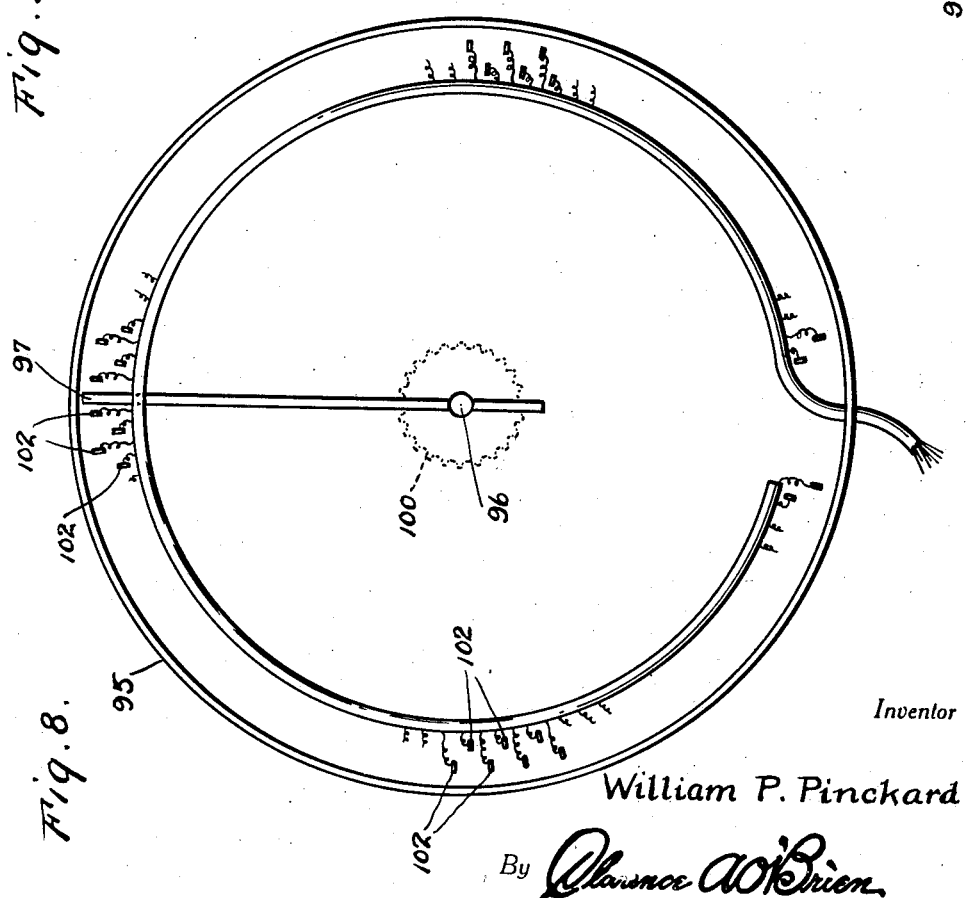
Inventor
William P. Pinckard
By Clarence A. O'Brien
Attorney May 10, 1932.  W. P. PINCKARD  1,857,740
AUTOMATIC TRAILER TRAIN STEERING MECHANISM
Filed March 4, 1931   10 Sheets-Sheet 9
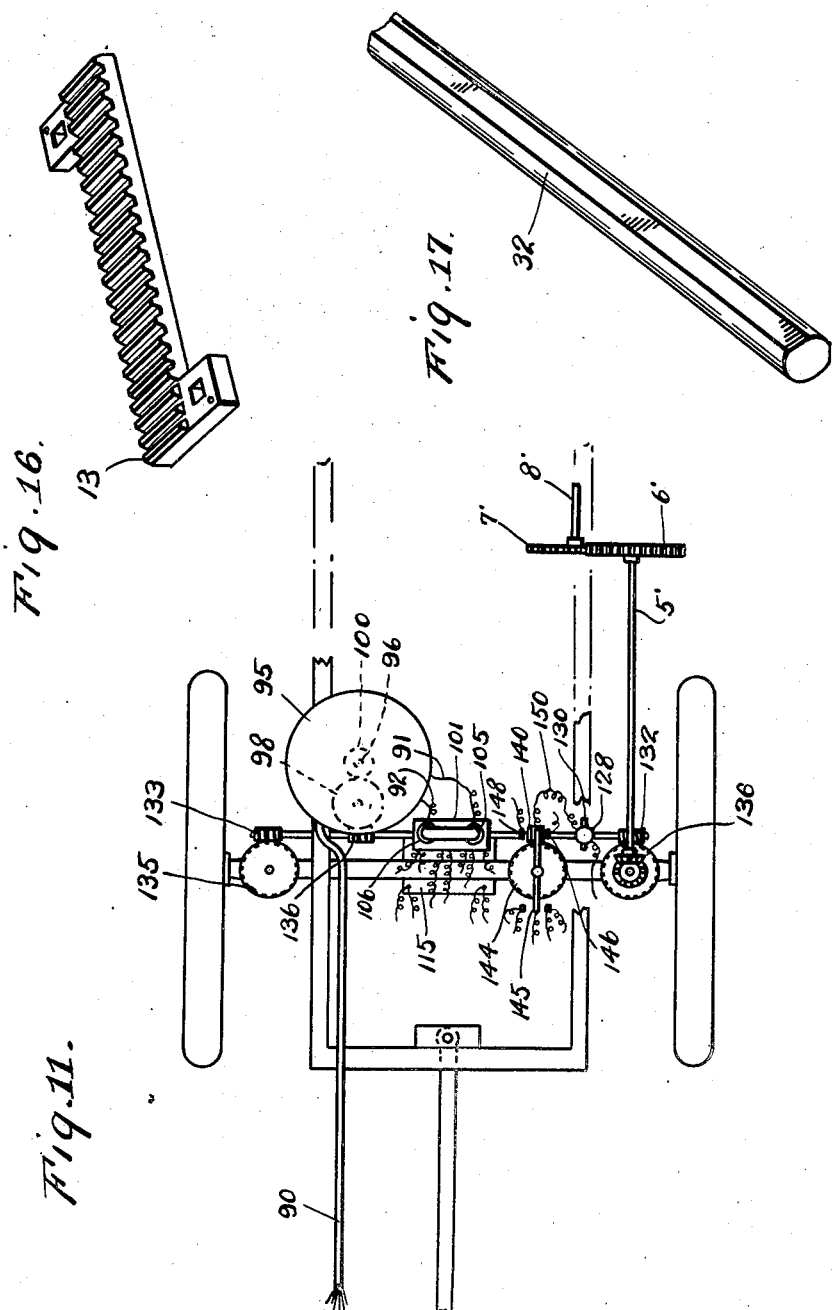
Inventor
William P. Pinckard
By Clarence A. O'Brien
Attorney

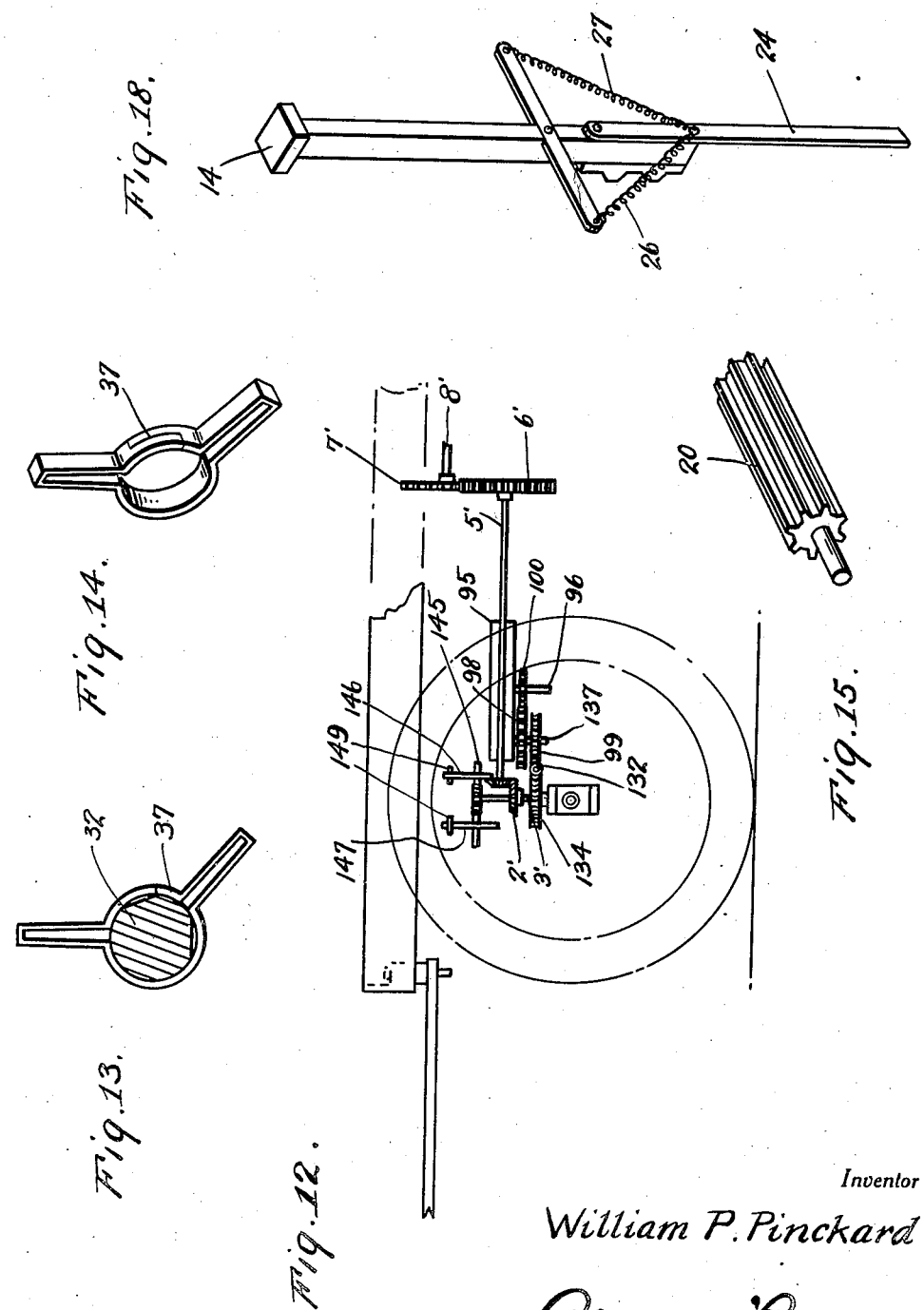

Patented May 10, 1932

1,857,740

UNITED STATES PATENT OFFICE

WILLIAM P. PINCKARD, OF SOUTH CHICAGO, ILLINOIS, ASSIGNOR OF ONE-HALF TO LEONARD PATTERSON, GEORGE ADAMS, AND PAUL A. GOSE, ALL OF CHICAGO, ILLINOIS

AUTOMATIC TRAILER TRAIN STEERING MECHANISM

Application filed March 4, 1931. Serial No. 520,171.

My invention relates to new and useful improvements in the automatic steering of a trailer vehicle or towed vessel or train of vehicles or vessels or other transport means where one unit is drawn or pushed behind another and it is desirable that in changing direction of travel the following units should follow in the path travelled by the leading unit or where an individual vehicle has more than one set of steerable wheels and it is desirable that the rear wheels should track with the front wheels in changing direction of travel.

The problem is to be solved to provide a mechanism which will record successively the movements of the leading front wheels, as they obey the steering wheel, but permitting the trailer front wheels to continue in the original direction until they reach the place where the lead truck front wheels have changed direction, then to so actuate the steering apparatus of the trailer front wheels, as to cause them to turn in arcs of the same degree on the same place that the lead truck front wheels turned on.

Similarly, the first trailer through similar apparatus, causes the second trailer to follow, the second trailer causes the third trailer, the third causing the fourth, and so on, each trailer performing the operation above.

Therefore, the principal object of the invention is to provide means for the practical operation of a train of trailers following a leading truck so that the changes of direction taken by the latter will automatically and successively be imparted to each succeeding steerable pair of wheels as it arrives upon the same spot at which the lead truck changed its direction of travel.

Another important object of the invention is to provide such a mechanism as will greatly lower the cost of motor truck transportation, especially in the case of long hauls, permitting large number of trailer units to be operated by a crew of one or two men.

While the foregoing specification sets forth certain objects and advantages there are other important objects and advantages of the invention which will become apparent to the reader of the following specification.

In the drawings:—

Fig. 3 represents a fragmentary side elevational view of the recording mechanism.

Fig. 4 represents a fragmentary vertical sectional view through the recording mechanism.

Fig. 5 represents a diagrammatic view showing the electrical devices of the third electrical circuit and the connections between the same.

Fig. 6 represents a fragmentary side elevational view of the right turn assembly of magnets.

Fig. 7 represents a diagrammatic view showing the devices and the connections between the same in the re-alignment apparatus.

Fig. 8 represents a plan view, partly diagrammatic showing the regulating apparatus.

Fig. 9 represents a fragmentary detailed sectional view showing one switch unit of the regulating apparatus.

Fig. 10 represents a fragmentary detailed sectional view of one of the switch units of the regulating apparatus.

Fig. 11 represents a top plan view of the forward portion of a trailer looking at the regulating and re-aligning apparatus and the connection to the rear of the trailer.

Fig. 12 represents a fragmentary side elevational view of the mechanism shown in Fig. 11.

Fig. 13 represents a cross section through a frame rod of the recording apparatus and showing one of the contact strips mounted thereon.

Fig. 14 represents a perspective view of one of the contact strips.

Fig. 15 represents a fragmentary perspective view of the elongated gear associated with the recording apparatus.

Fig. 16 represents a perspective view of the rack included in the recording apparatus.

Fig. 17 represents a fragmentary perspective view of the frame rod shown in Fig. 13.

Fig. 18 represents a perspective view of one of the feelers or fingers of the recording apparatus.

Figure 1:
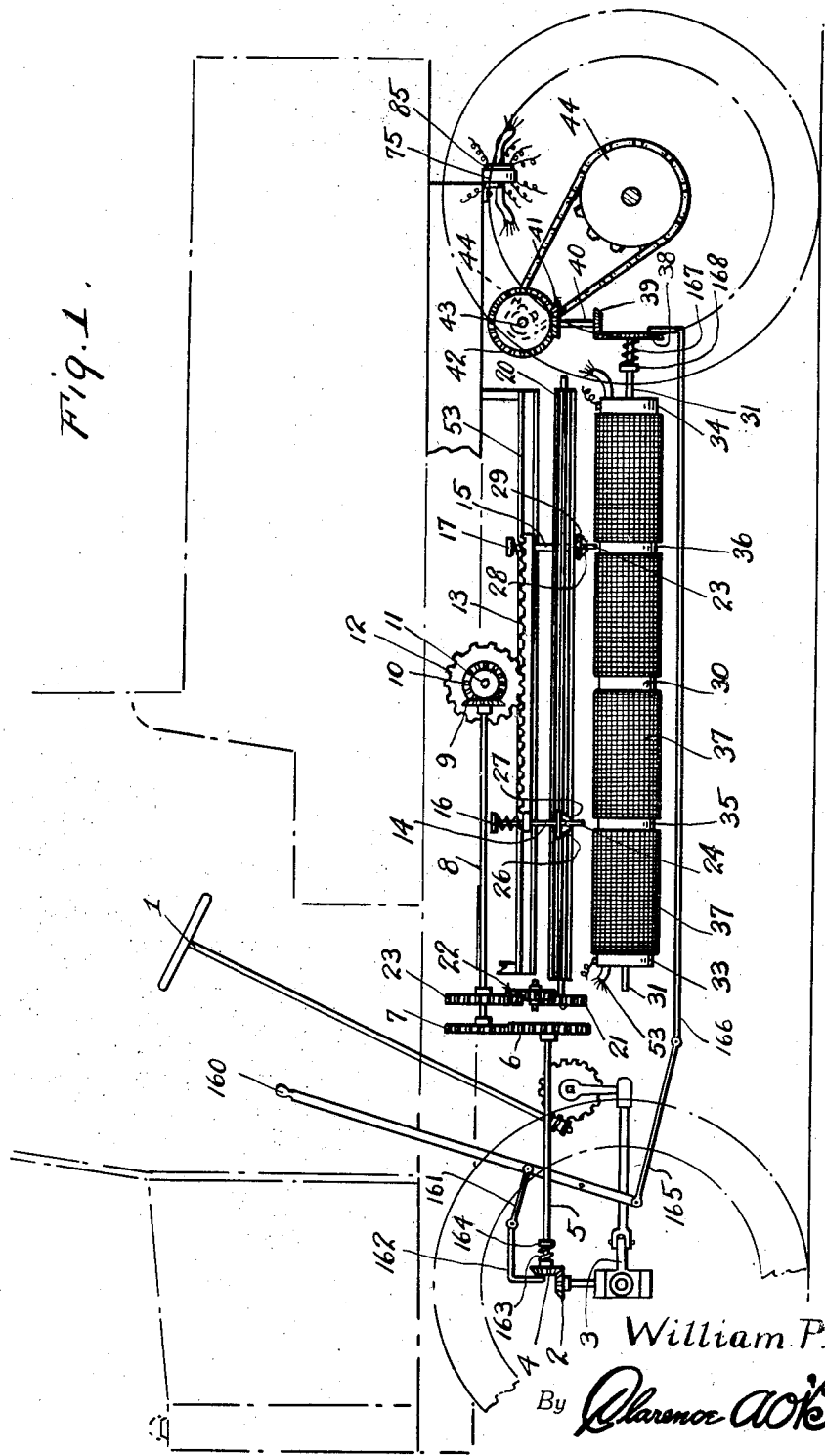
Figure 1 represents a side elevational view of the recording apparatus on the lead truck.
Figure 2:
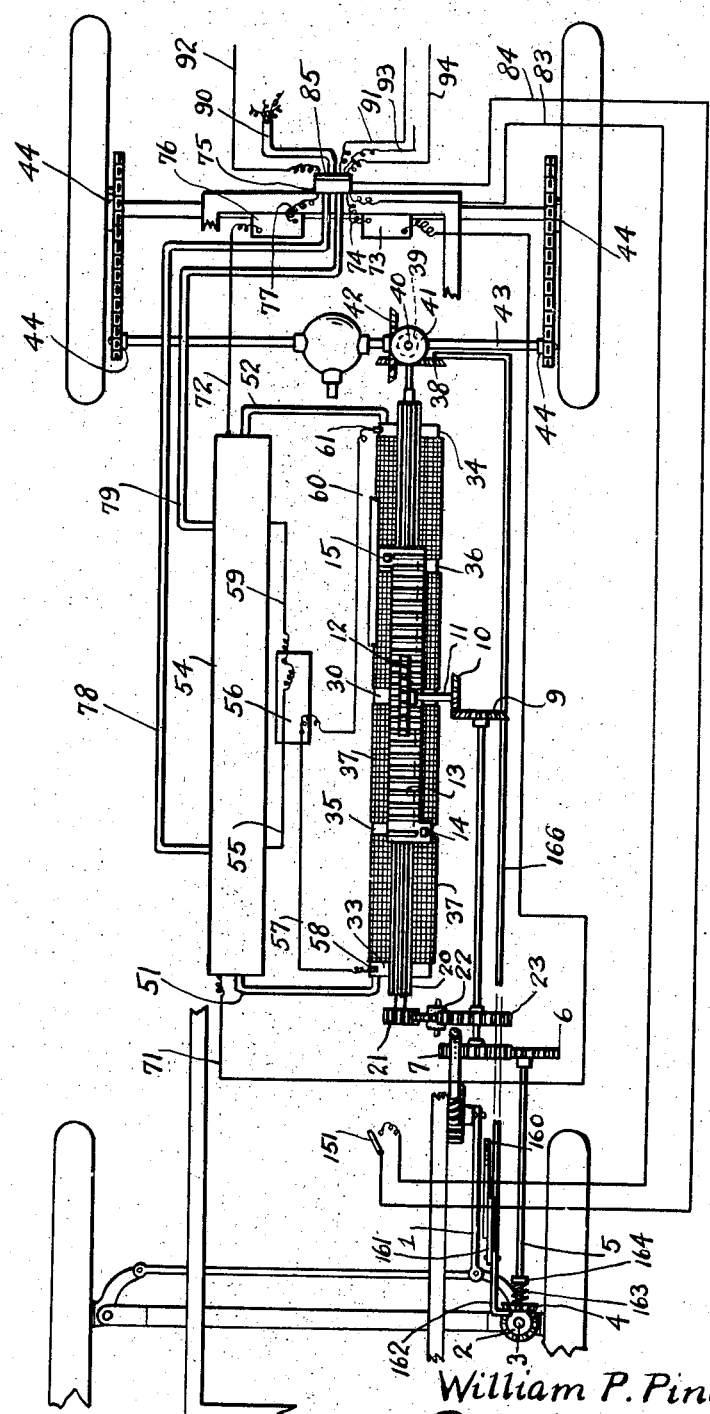
Fig. 2 represents a top plan view of the recording apparatus on the lead truck and showing certain connections between the electrical devices involved.

Referring to the drawings wherein like numerals designate like parts, it will be observed that the mechanical features of this mechanism are dividable into four factors; namely, the recording apparatus; the transmitting apparatus; the actuating apparatus, and the re-aligning apparatus. The transmitting apparatus includes the regulating mechanism shown in Figs. 8, 9 and 10.

Electrically, the system can be divided into the primary circuits; the secondary circuits; the third circuits; and the re-alignment circuits. The primary circuit functions to close the secondary circuit at the appropriate time.

The secondary circuit functions to close the third circuit, and keep itself and the third circuit both closed until the desired arc has been turned and the secondary circuit opened by the regulating apparatus. The opening of the secondary circuit automatically opens the third circuit.

The third circuit actuates the steering motor of the trailer. The re-alignment circuit provides a means to correct accumulated mechanical inaccuracies in steering.

The steering gear 1, causing the front wheels of the lead truck to swing to the right or left, the bevel gear 2, mounted upon the pivot 3, upon which one front wheel swings (say the left wheel), turns in the same angular degree as the swing of the wheel. This revolution of bevel gear 2 is imparted to bevel gear 4, in mesh with bevel gear 2, bevel gear 4 is keyed to a horizontal shaft 5, upon the other end of which is keyed spur gear 6, in mesh with spur gear 7, which is keyed upon a horizontal shaft 8, upon the other end of which is keyed bevel gear 9, in mesh with bevel gear 10.

Bevel gear 10 is keyed to a horizontal shaft 11, which is at right angle to the horizontal shaft 8. At the other end of horizontal shaft 11 is keyed the spur gear 12 in mesh with the rack gear 13. As spur gear 12 revolves, rack gear 13 is driven forward or backward longitudinally along and above an apparatus which we may call the recording drum, as it registers the successive changes in direction of the front wheels and applies them to the transmitting apparatus at the appropriate time.

The rack gear 13 is so made that at each end and upon opposite sides square sockets are formed in which squared iron rods 14 and 15 are free to move vertically. The tops of these rods are flattened to form projecting shoulders. Attached to the shoulder of each is a spring 16 and 17. The other end of each spring 16 or 17 is attached to the rack gear 13. At the lower ends of rods 14 and 15 are cut a few rack gear teeth 18 and 19. There are, say two of these teeth upon the lower end of each rod. These rack gear teeth are cut on the inside of the rods 14 and 15, and by the tension of the springs 16 and 17 tend to mesh with a long shaft like gear 20. At each end 20 is ground down to form a bearing surface. A spur gear 21 is keyed to the end of the long gear 20, and is in mesh with an idler spur gear 22 which is in turn, in mesh with spur gear 23, which is keyed upon shaft 8, above described.

As above described, it also is apparent that, when the front wheels being steered by the driver, swing, a revolving motion is imparted to the bevel gears 2 and 4, shaft 5, the spur gears 6 and 7, the shaft 8, the spur gears 23, 22, 21 and the long gear 20. The tension of the springs 16 and 17 tends to keep the rack gear teeth of the rods 14 and 15 in mesh with the long gear 20, but when 20 revolves, one of the rods 14 and 15 is forced downward and out of mesh, (there being only two teeth), and the other rod is forced upward and out of mesh according to the direction in which 20 revolves.

Obviously, when the front wheels are steered to the right, the gear trains and long gear 20 revolve in a certain direction, and rod 14 is depressed and rod 15 lifted and, when a left turn is made, the gear trains and gear 20 revolve in the opposite direction, and rod 14 is raised and rod 15 depressed. On the lower ends of rods 14 and 15 are attached narrow metal strips or fingers 24 and 25, pivoted so that they are free to move sideways from the rods but not in other directions. Small springs 26, 27 and 28 and 29, exert tension to keep these fingers 24 and 25 centered against rods 14 and 15 but permit them to swing when side pressure is placed against them, as when they strike the side of one of the projecting contact strips described below. The point of the fingers attached to the rod that is depressed, lies close to the recording drum, and between the rows of projecting points upon the drum.

The recording drum is composed of a center wheel 30, mounted upon a shaft 31. Through holes in the rim of the center wheel, small rods 32, extend parallel to the shaft 31 in both directions. The ends of these rods 32 are inserted into sockets in the rims of two open rings 33 and 34 which may be called "end rings". One of these end rings 33 and 34, is at each end of the rods 32. Halfway between the center wheel 30 and the end rings 33 and 34 are two other open rings 35 and 36, which may be called "neutral space rings". The rods 32 pass through holes drilled through the rims of the neutral space rings 35 and 36. End rings and neutral space rings are supported by roller bearings (not shown). Strips of spring brass hereafter called contact strips, are doubled upon themselves to take an obtuse angular shape 37, with an opening in the center at the angle, to fit the rods 32. These obtuse angular strips 37 or "contacts" are mounted closely together upon the rods 32 between the center wheel 30 and neutral space rings 35—36, and between the neutral space rings 35, 36 and the end rings 33—34. The rods 32 are flattened upon two sides and the spring effect of the ends of the obtuse angular contact strips 37 tends to keep them in position on the rods; but the contact strips 37 revolve freely about the rods when slight pressure is applied. Normally, one point of contact strip 37 is pointing externally away from the center of the drum but, when pressure is applied, it revolves approximately one-quarter circle and that point assumes an approximately tangential position in relation to the drum, while the other point of the contact strip points inwardly approximately toward the center of the drum.

There are a sufficient number of rods 32 according to the diameter of the drum, (say the contact strips 37 project one-half inch), to make a continuous circle of contact strips about the drum, (let us say a circle of thirty-six contact strips). There would be, then, thirty-six of these rods. The diameter of the drum, number of contacts in each circle, the same number of rods, may be, as convenient.

Each of these circles of contacts represents one unit arc of turning, say one degree (1°), which is the unit taken in the accompanying drawings. That means that for every degree that the driver turns the leading front wheels away from the straight ahead direction, there must be a circle of contact strips upon the drum, and for each degree turned back toward the straight ahead course there must be a separate circle of contacts also.

If the total arc in which the wheels may turn from extreme left to extreme right be one hundred ten degrees (110°) which is the arc assumed here, there must be a total of two hundred twenty (220) of these contact circles—one hundred ten (110) for left turn from extreme right to extreme left, and one hundred ten (110) for right turn from extreme left to extreme right. The width of each contact may be say, one-eighth inch or even one-quarter inch as found convenient. The length of the recording apparatus would be about thirty-one inches (31 inches) for a one-eighth inch contact, and if they were one-quarter inch would be about fifty-nine inches (59 in.). They are of course, all the same size in either case.

The operation of the recording drum is as follows: when the truck and trailer are proceeding straight ahead the drum is revolved by means of train of gears connected with the jack shaft or rear road wheels. In the drawings, bevel gear 38 is keyed to drum center wheel 31. Bevel gear 38 is in mesh with bevel gear 39, which is keyed to a vertical shaft 40, upon the other end of which is keyed bevel gear 41, which is in mesh with bevel gear 42, which is keyed to the jack shaft 43, of the truck which revolves with the road wheels through the operation of the sprockets and chain 44. The ratios of the gears 38, 39, 41 and 42—the sprockets and the diameter of the road wheels are such that gear 38 and the recording drum complete a little less than one revolution during the time that the road wheels are travelling a distance equal to the distance between the front wheels of the leading vehicles and the front wheels of the following vehicle.

As stated before the vertical rods 14 and 15, which are suspended from the rack gear 13 and are depressed and lifted by the long gear 20 according to the direction of its revolution, have points or fingers extending downward from the lower end: the end of the finger which has been depressed by gear 20, will reach below the upright ends of the contact strips 37. When the road wheels point straight ahead, the rack gear 13 is in a state of rest although the recording drum itself is revolving through the action of the gear train 38, 39, 41, and 42, connecting it with the jack shaft and road wheels. The finger points then are suspended over the neutral space rings 35, 36.

If now, the driver turns the front wheels, say to the right, the gear train, 2, 4, 6, 7, 9, 10, 12, revolves, causing the rack gear 13 to move toward the front of the truck (to the left in the drawing). At the same time, long gear 20 is revolved through gear train 2, 4, 6, 7, 23, 22, 21, and depresses rod 14 and lifts rod 15. As the rack gear 13 moves to the front, the contact strips 37, of that portion, (the first or left end segment), of the recording drum, strike against the finger 24 of rod 14, because of the revolution of the recording drum through action of gear train 42, 41, 39, 38. As they strike the finger they are turned over on their axes, approximately one-quarter circle, the point of the contact 37 that struck the finger assuming an approximate tangential position in reference to the circumference of the drum while the other point of the contact 37 extends inward toward the center of the drum.

The rack gear 13, by reason of the ratios of the various gears, crosses one ring of contact strips (one ring around the drum), for every one degree (1°) the driver turns the front wheels, and the number of contact strips within each circle that is turned over is according to the length of time each one degree (1°) arc of turning is held by the driver.

When the recording drum, through the action of its gear train 38, 39, 41, 42, the jack shaft, sprockets, chain and rear road wheels, has almost completed one revolution, and the trailer front road wheels have reached the spot on the road where the lead truck front wheels turned, the contact strips which have been turned over and pointed inward by the finger of rod 14, meet a bar 45, extending through the open front end ring 33 to inside the drum almost to the center wheel. (A similar bar 47 for left turns extends through the other open end 34, almost to the center wheel.) These bars we may call the transmitting bars.

The right turn transmitting bar 45 is made of di-electric material and mounted upon it, but insulated from each other, are small metal plates 46. Each plate is considerably narrower than the contact strips. When the contact strips 37 meet their respective metal plates, each contact 37 revolves on its axis as it strikes its plate 46, and returns back to its original upright position as it clears it.

When the end of the right turn is reached and the driver begins to turn back left again, the revolution of the gear trains 2, 4, 6, 7, 9, 10 and 12 and 13; and 2, 4, 6, 7, 23, 22, 21 and long gear 20 is reversed. Rod 14 is lifted and rod 15 depressed; and the contact strips 37, in the third segment, (the one just in rear of the center wheel 30), are turned over, and in due time returned to an upright position by meeting the other transmitting bar 47, (for left hand turns), with metal plates 48, mounted upon it. Transmitting bar 47 and metal plates 48 are identical with transmitting bar 45 and metal plates 46; 45 and 46 being for right turns only and being inserted from the front open end (33) of the drum, and 47 and 48 being for left hand turns only, and being inserted from the rear open end 34 of the drum.

If the driver turns left from the straight ahead direction the revolution of long gear 20 depresses rod 15 and lifts 14, and the finger 25 of 15 moves through the projecting contact strips 37 of the fourth segment of the recording drum (the one on the extreme right in the drawings). Then, when the driver steers back to the right to the straight ahead again, bar 15 is lifted and bar 14 depressed, and the finger 24 of the latter moves through the rows of contact strips in the second segment of the drum—(the one between neutral space ring 35 and the center wheel 30). The first segment of the recording drum (between the ring 33 and neutral space ring 35) is for right turns from the straight ahead to the right, the third segment for left turns from the right back to the straight ahead, the fourth segment is for left turns from the straight ahead to the left, and the second segment for right turns from the left back to the straight ahead.

Attention is called to the principle that only one contact strip at a time can contact with the metal plates of the transmitting bar, nor can right and left contacts meet these plates at the same time. These plates 46 and 48, are made purposely small to avoid more than a brief contact with the contact strips.

Each transmitting bar is firmly mounted opposite its end of the recording drum and extends inside the drum as a projecting arm. Each bar is close to the drum and its plates 46 or 48 are within the distance of the length of the contact strips, and each bar is close to the path traveled by the corresponding finger 14 or 15, on the side of that path in the direction from which the revolution of the recording drum comes.

To each plate 46 or 48, is attached a small insulated copper wire 49, and 50. There are one hundred ten (110) of these plates and wires for the right turn arcs, and one hundred ten (110) for the left turn arcs. The right turn wires (all insulated) are bound together as a cable 51, and the left turn wires (all insulated) are bound together as a cable 52, for convenience in handling. These cables, 51 and 52 lead to what may be called the magnet box 53, which extends lengthwise beneath the vehicle, opposite the recording drum. Cable 51 for the right turn extends to the front end and cable 52 for the left turn extends to the rear end of the magnet box.

At the magnet box the cables are separated into their component insulated wires. Each wire is coiled around a soft-iron core mounted within the magnet box to form an electromagnet 54. There are one hundred ten (110) of these magnets for the right turn in the front half of the box, and one hundred ten (110) of them in rear half for the left turn—one magnet for each one degree (1°) arc of turn made by the front road wheels. Each wire 49, after completing the coil around the magnet, is connected to a wire 55, which is common to all of them and leads to negative pole of a small storage battery 56.

From the positive pole of battery 56, a wire 57 leads to an electric brush 58 in contact with end ring 33. Similarly, each wire 50 from the left turn side is separated from its cable 52 and coiled around a soft iron core to form an electro-magnet 54, and after completing its coil around its magnet 54, unites with a common wire 59, which leads to the same pole of battery 56 that wire 55 leads to (negative). From the other pole (positive) of battery 56, a wire 60 leads to an electric brush 61, which is in contact with end ring 34.

Therefore, it is apparent that when a contact strip 37 which has been turned over by striking against the finger of rod 14 or 15, as the recording drum revolves, so that the other part (which is at an angle to the part which comes in contact with the finger) is turned inward toward the center of the drum,—and near the completion of its revolution comes in contact with the appropriate plate 46, or 48, mounted upon the transmitting bar, 45, or 47—that an electric circuit is momentarily closed and electric current flows momentarily around the particular magnet core 54 involved; and that this core and coil will become immediately magnetized. These electric circuits through the contacts 37, transmitting bar plates 46, or 48, wires 49 or 50, magnet coils 54, common wires 55 or 59, battery 56, return wires 57 or 60, brushes 58 or 61, and through the end rings 33 or 34, the frame rods 32, and the contacts 37, may be called the primary circuits.

When either primary circuit is closed momentarily (while a contact strip 37 is passing over a transmitting bar plate 46 or 48) the magnet 54 involved, attracts a soft-iron plunger, 62, resting upon a bearing surface, 63. Attached to the soft-iron plunger 62 and passing through a hole in bearing surface 63, is an iron pin 64, about say one inch long, which moves vertically up and down with plunger 62. A shoulder 65 is formed upon the pin and this shoulder normally rests upon another bearing surface 66, through a hole in which the pin 64 also passes. A spiral spring 67 surrounds the pin 64 between the shoulder 65 and the bottom side of bearing surface 63.

Now, when a primary circuit is closed, the magnet 54 involved, draws its plunger 62 and pin 64 upward against the tension of the spring 67; upon the lower portion of the pin 64 is mounted horizontally a small brass contact plate 68 which when the plunger and pin are drawn upward by the magnet 54, comes in contact with another small brass plate 69, attached to the bottom side of bearing surface 66, but insulated from it. An insulated wire 70 extends from lower brass plate 68 and unites with another wire 71 which is common to all right hand turn magnets, or to a common wire 72 in the case of all left turn magnets.

Right turn wire 71 extends to one binding post of the battery 73. From the other binding post of the battery 73, an insulated wire 74 extends to the connecting plug 75, described below. Left turn insulated wire 72 extends to one binding post of another battery 76. From the other binding post of battery 76, an insulated wire 77 extends to connecting plug 75. From each upper brass plate 69, an insulated wire 78, for right turn, and an insulated wire 79 for left turn magnets extends to the coils around each magnet 54. That is, an individual wire from each individual brass plate 69 extends to and around each individual magnet 54. These insulated wires 78 and 79 are wound around the cores of their respective magnets 54, together with the individual insulated wires 49 and 50 of the primary circuits. As the insulated wires 78 and 79 of the individual magnets complete the coil around the core, they are gathered into cables 78 and 79. Cable 78 extends to the connecting plug 75, mounted upon the rear of the truck. Cable 79 also extends to this plug.

The connecting plug 75 consists of a small box mounted vertically and open to the rear. Within this box is a plate of di-electric material 80, which has holes drilled through it in which are mounted copper binding posts 81; one hundred ten (110) of them—one for each one degree (1°) arc of turn—one (1) for right turn return wire, one (1) for left turn return wire, and two (2) posts for two re-alignment apparatus wires 83 and 84 hereafter described—one hundred fourteen (114) binding posts in all. The di-electric plate 80 is mounted upon four (4) springs 82 which are attached to the connecting plug case 75.

The binding posts 81 extend thru di-electric plate 80 and the internal end of each of these binding posts is attached to the appropriate individual insulating wire of cables 78 and 79 or right turn return lead 74, or left turn return lead 77, or the re-alignment apparatus wires 83 and 84. These wires enter the connecting plug box through holes in that side of the connecting plug which is toward the front of the truck. The right turn wires and the left turn wires—78 and 79,—controlling the same one degree (1°) arc of turn, regardless of direction, unite at the electric plug. But the right turn return lead wire 74, and the left turn return lead wire 77, have separate binding posts 81.

Another connecting plug 85, exactly similar to 75, except that its external dimensions permit it to slip inside of 75, contains a di-electric plate 86, exactly similar to di-electric plate 80, of connecting plug 75. Di-electric plate 86 is mounted upon four (4) springs 87. One hundred fourteen (114) binding posts 88, equal in number and position to the one hundred fourteen (114) binding posts 81, are mounted in holes drilled through di-electric plate 86.

When plug 85 is slipped inside of plug 75, each binding post 88 is in contact with the corresponding binding post 81—the outer ends of these binding posts are flattened to make good electrical contact with one another. The tension of springs 82 and 87 keeps these binding posts 81, and 88, pressed firmly against one another.

Two simple right angular bars when turned inward lock plug 85 in position within plug 75. Individual insulated wires are attached to the internal ends of each binding post 88. One hundred ten (110) of these wires, 90 correspond to the individual wires of cables 78 and 79, which are combined at the connecting plug. These wires emerge through a hole in the rear side of connecting plug 85 and are gathered into a cable 90. One wire 91 attached to one of the binding posts 88, corresponds to the right turn return lead wire 74, and is electrically connected with it through the corresponding binding posts 81 and 88.

Another wire 92 corresponds to the left hand return lead wire 77, and is likewise in connection with it through suitable binding posts. Similarly the wires 93, and 94, are connected through individual binding posts 88 and 81, to the re-alignment apparatus wires 83 and 84 hereafter described.

The wires 90, cabled together, are led to the "regulating apparatus" 95, enough slack being left in the cable length so as not to interfere with the steering of the trailer.

The regulating apparatus consists of a flat horizontal cylindrical box 95, the top of which is composed of di-electric material, and the sides and bottom of metal. Through the center passes a vertical shaft 96, which is geared to the shaft of the steering motor 101 of the trailer. Attached at right angles to the shaft 96 in the center of the regulating apparatus, is a flat di-electric rod 97, which revolves with the shaft 96, when the latter is actuated through its gears 100, 98, 99, and 136, by the trailer steering motor 101. The di-electric rod 97, as it revolves, sweeps between and separates pairs of vertical brass plates, 102—103, breaking the electrical connection between them.

Each pair of vertical plates 102 and 103, consists of an upper plate 102 hinged to the top of the regulating apparatus box 95 and a lower plate 103, hinged to the bottom of the recording apparatus box. The lower or free end of the upper plate 102 laps the upper or free end of the bottom plate 103. A pair of springs 104, attached to the pivot or hinge of each plate exert a tension keeping it vertical and in electrical contact with the other plate.

Each upper plate by reason of the di-electric material of the top of the regulating apparatus box, is electrically insulated from every other upper plate. Each of the insulated wires 90 is separated from the cable 90, and attached to one upper plate 102. On the other hand, each lower plate 103 is in electrical contact with every other lower plate through the metal of which the bottom of the regulating apparatus is composed.

The wire 91—the return lead to the right turn magnets 54—leads from the electric coupling plug 85 to coil around a soft iron core mounted upon the trailer to form an electro-magnet 105. From the coil it leads to the bottom of the regulating apparatus box and forms electric contact through it, with every lower vertical plate 103, completing the secondary circuit for right turn magnets 54. The wire 92—the return lead to the left turn magnets 54 leads from the electric coupling plug 85 to coil around a soft iron core to form another electro-magnet 106.

From the coil it leads to the bottom of the regulating apparatus box and, through it, is in electric contact with lower vertical plates 103, thus completing the secondary circuit for left turn magnets 54.

When the primary circuit for either right or left turns is closed thru any one of the wires 49 or 50 of cables 51 or 52 forming the coil of an electro-magnet 54 (i. e., when a turned down contact strip 37 establishes contact with the corresponding plate 46 or 48 of transmitting bar 45 or 47), the primary current flowing momentarily through the coil of a magnet 54 excites it and causes it to draw upward the plunger 62, attached pin 64 and brass plate 68, mounted upon pin 64, so that plate 68 comes in contact with another stationary brass plate 69. This contact between plates 68 and 69 closes the secondary circuit above described. The secondary current passes through a wire 78 for right turn or a wire 79 for left turns which are wound with the corresponding primary wires 49 or 50 around the cores of that particular magnet 54.

The particular magnet 54 is then excited by the current of the secondary circuit as well as by the primary current, and when the primary circuit is opened by the passing of the contact strip 37 from the plates 46 or 48 of the transmitting bar 45 or 47, the magnet 54 being still excited by the secondary current, continues to attract the plunger 62 with its pin 64 and brass plate 68, and to hold the latter against the stationary plate 69. The secondary current passes through a plate 69, through a wire 78 or 79 about a magnet 54, thence through a cabled wire 78 or 79 to the connecting plug 75, thence through the trailer half of the connecting plug 85 through an individual, insulated cabled wire 90 to the regulating apparatus box 95, where each separate insulated wire 90 is connected to an insulated hinged upper regulating plate 102 (which is insulated from other upper plates) and which is in electrical contact with a lower regulating plate 103, which is not insulated from other lower regulating plates 103, as all the lower plates are in contact with the metal bottom of the regulating apparatus box. The current passes from plate 103 to the metal bottom thence, in the case of a right turn, through wire 91, coiled to form the electro-magnet 105, thence to the connecting plug 85—75, thence through the wire 74 to the negative pole of a storage battery 73, thence from the positive pole through the wire 71 to the magnet box 53. From wire 71, common to all right turn magnets, to an individual wire 70, which extends to the brass plate 68 which is mounted upon the pin 64, attached to the plunger 62 of each magnet.

Plate 68 remains in contact with plate 69 from which wire 78 extends to coil around its magnet 54 which remains excited by secondary current and keeps the secondary circuit closed until opened by separation of vertical plates, 102, 103, by rod 97. In the case of left turns the secondary current leaves the bottom regulating plate 103 through the metal regulating box bottom and passes over a wire 92 coiled to form another electro-magnet 106, thence wire 92 leads to electric connecting plug 85, 75 where it establishes contact with wire 77, thence over wire 77 to the negative pole of a storage battery 76, thence from the positive pole over the wire 72 to the magnet box 53.

Wire 72 is common to all left turn magnets and from it the individual wires 70 lead to the brass plate 68 attached to the plunger pin 64 of these magnets. It is apparent that, once the secondary circuit is closed through the action of the primary circuit, it will remain closed until broken through the action of some outside agency. The agency is provided by the action of the flat, di-electric rod 97, mounted upon the shaft 96 which is connected through gears with the shaft of the trailer steering motor (101). This motor is operated by the third or main circuit, hereafter described. Operating in conjunction with this motor, the di-electric rod 97 sweeps between and electrically separates the upper and lower regulating plates, thus breaking the secondary circuits at the desired time.

Just as the function of the primary circuit was to close the secondary circuit, so is it the function of the secondary circuit to close the third or main circuit, and keep it closed until the desired arc has been turned by the road wheels.

This is accomplished through the action of the electro-magnet 105 in case of right turns, and electro-magnet 106 in case of left turns.

When the secondary circuit is opened by the separation of the hinged plates 102—103, it becomes open also in the magnet box for the corresponding magnet 54, which becomes demagnetized releasing its plunger 62 and pin 64 which are forced downward by spring 67, thus separating lower contact plate 68 from upper contact plate 69.

The electro-magnet 105 when electrically excited, by the passage of the secondary current through its coil, attracts one end of an electric switch 107, which is pivoted in the center and composed of soft iron. The electro-magnet 106, when electrically excited by the secondary current, attracts the other end of switch 107. When the electro-magnet 105 is excited, that end of the switch 107, is drawn upward, and a brass contact 108, on that end of the switch 107 which is insulated from the rest of the switch, comes in contact with a stationary contact 109. And a contact 110 on the other end of and insulated from switch 107 which is drawn downward, comes in electrical contact with another stationary contact 111.

When electro-magnet 106 is excited, its end of the switch 107 is drawn upward and contact 110 comes in electrical contact with stationary contact 112, and contact 108 comes in electrical contact with stationary contact, 113.

Insulated wires 114, and 115 lead from the contacts 108 and 110 on the two ends of the main switch 107 through "pigtail" ends to the two poles of a large storage battery 116. Between contact 108 and the positive pole of battery 116 many turns of wire 114 are wound around a soft iron core to form an electro-magnet 128.

Stationary contact 109 is connected to an insulated wire 117, which leads to one brush binding post 118 of a motor 101. The stationary contact 112 is connected to an insulated wire 121 leading to the brush binding post 118 of the motor 101.

The stationary contact 113 is connected to an insulated wire 122 which leads to brush binding post 120 of motor 101.

One field coil binding post, 123 of motor 101 is connected to stationary contact 112 by an insulated wire 124. Field coil binding post 123 is connected also to stationary contact 111 by an insulated wire 125. The other field coil binding post 126 of motor 101 is connected by an insulated wire 127 to that pole of the battery 116 (positive pole) to which wire 115 is not connected. When a right turn having been made and the primary and secondary circuits closed in due course, the electro-magnet 105 is excited by the passage of the secondary current from battery 73, the end of the switch 107 adjacent to electro-magnet 105 is lifted, and contact 108 on that end of the switch 107 comes into electrical contact with stationary contact 109.

Current then flows in the third circuit from the positive pole of battery 116, through wire 114 which coils around a soft iron core to form an electro-magnet 128, (the function of which is to attract when excited, a soft iron plunger 129, thereby releasing the shaft of motor 101 from the braking action of the plunger 129 which was in mesh with spur gear 130 seated upon the shaft of motor 101) thence to the contact 108 on that end of switch 107 which is attracted by right turn magnet 105 when the secondary current flows, through the stationary contact 109, through the wire 117 to the brush binding post 118 of motor 101,—through the armature coils of motor 101 to the brush binding post 120, through wire 119 to stationary contact 111, thence to contact 110 upon that end of switch 107 thence through wire 115 to the negative pole of battery 116.

At the same time current flows through the field coils of motor 101 as follows:—

From the positive pole of battery 116, through wire 127 to field coil binding post 126 of motor 101, through the field coil windings of motor 101 to field coil binding post 123, through wire 125 to stationary contact 111, through contact 110 on switch 107, through wire 115 to the negative pole of battery 116.

It is apparent then that when through the excitation of electro-magnet 105, that end of switch 107 is attracted so that the switch contacts 108 and 110 press against stationary contacts 109 and 111, that separate electrical circuits from battery 116 are closed thru the armature windings and field coil windings of motor 110.

Magnet 128, being excited by the current passing through wire 114 from the battery 116 to switch contact 108, draws the soft iron plunger 129 upward against the tension of spring 131. The plunger then being put out of mesh with spur gear 130 on shaft of motor 101, motor 101 revolves. Worm gears 132 and 133 on the end of the shaft of motor 101 are in mesh with gears 134 and 135 which are seated upon the pivot shafts of the trailer's front road wheels.

The front road wheels of the trailer therefor, are turned to the right through the electrical excitation of magnet 105 which attracts switch 107, closing the electrical circuits through battery 116 and motor 101. Another worm gear 136, upon the shaft of motor 101, is in mesh with a gear 99 which is mounted with a spur gear 98 of corresponding size upon a vertical shaft 137. Spur gear 98 is in mesh with another spur gear 100 which may be about one-third the size of gear 98. Spur gear 100 is seated upon a vertical shaft 96, the upper end of which passes through the center of the bottom and top of the regulating apparatus box 95. The flat di-electric rod 97 mounted at a right angle upon shaft 96 sweeps horizontally through the center of regulating apparatus box 95 as motor 101 revolves and the front road wheels of the trailer swing to the right.

As rod 97 sweeps through the box it separates the upper and lower hinged brass plate pairs (102 and 103), through which the secondary current flows. These pairs of upper and lower plates are so set in the regulating apparatus box 95, that the position of each pair corresponds to a one degree (1°) angle of turn reached by the front road wheels when turned by the revolution of motor 101. (Each of these one degree intervals corresponds also to a right turn magnet 54, and left turn magnet 54 in the magnet box 53, and to a right turn ring of contact strips 37, and a left turn ring of contact strips 37 on the recording apparatus drum.)

When a pair of upper and lower plates 102 and 103 are separated by rod 97, the front road wheels of the trailer will have been turned thru an arc corresponding to that pair of plates. When the plates are separated, the secondary circuit through those plates is broken. When the rod 97 has separated the ultimate pair of plates 102—103 thru which the secondary current is flowing, the current ceases to flow through the coil of magnet 105, and it becomes de-magnetized—releasing the switch 107 which is returned to neutral position by the tension of two springs 138 attached to it.

When the plates 102—103 are separated the magnet 54 which corresponds to that pair of plates becomes de-magnetized also, and the tension of spring 67 forces plunger 62, pin 64, and lower contact plate 68 downward. Lower plate 68 is separated from the upper plate 69, and the secondary circuit is thereby opened in the magnet box.

The third circuit being then broken by the return of switch 107 to neutral position, electro-magnet 128 also becomes de-magnetized, releasing plunger 129 which is forced by spring 131 into mesh with spur gear 130, which is seated on the shaft of motor 101, thus locking the shaft of the motor 101. When a left turn is made, electro-magnet 106 becomes excited in a similar manner by the flow through its coils of the secondary current from the other secondary battery 76—the end of switch 107 adjacent to electro-magnet 106 is attracted so that contact 110 upon that end of switch 107 comes into electrical contact with stationary contact 112, and contact 108 upon the other end of switch 107 comes into electrical contact with stationary contact 113.

Current then flows from battery 116 through wire 114 through the coils of magnet 128 to contact 108 on switch 107, through stationary contact 113, through wire 122 to brush binding post 120, through the armature windings of motor 101 to brush binding post 118, through wire 121 to stationary contact 112, through contact 110 on switch 107, through wire 115 to the negative pole of battery 116.

It is apparent that the course of the current through the armature windings of motor 101 when magnet 106 is excited is opposite to that when magnet 105 is excited. But the current from the battery 116 through the field coils windings flows in the same direction in both cases. But instead of reaching contact 110 on switch 107 by passing from field coil binding post 123 through wire 125 to stationary contact 111, it passes from field coil binding post 123 through wire 124 to stationary contact 112. In both cases it reaches the field coil windings by passing from the positive pole of battery 116 through wire 127 to field coil binding post 126, and returns through the contact 110 on switch 107 through wire 115 to negative pole of battery 116 as before. So whether electro-magnet 105 or electro-magnet 106 is excited, the current from battery 116 passes through the field coil windings of motor 101 in the same direction. But the current passes through the armature windings of motor 101 in opposite directions in the two cases. Therefore, when electro-magnet 106 is excited the motor 101, will revolve in an opposite direction to that when electro-magnet 105 was excited, and hence the trailer front road wheels will be turned toward the left when 106 is excited just as they turned toward the right when 105 was excited.

The regulating apparatus controls the turning in the same manner in both cases except that it revolves in opposite directions in case of a left turn. Electro-magnet 128 operates exactly the same way in releasing and locking the shaft of motor 101 in both cases. Thus the steering movement of the leading trucks front wheels are reproduced by the trailer front wheels on the same ground. Though the apparatus is designed for use with manually steered trucks, good results would probably be attained if the leading truck were steered electrically by means of a motor 101 controlled by the driver through a double throw switch.

The degree of accuracy being limited to one degree (by increasing the dimensions of the apparatus it may be carried to a finer point), and there also being limitations of mechanical accuracy in constructing the device, it is desirable to have some means provided to re-align every pair of front wheels in the truck and trailer train, at the same time, at the will of the driver, while the train is in motion.

A gear 139 of the same size and similar to gears 134 and 135 on the pivot of the trailer road wheels, is in mesh with a worm gear 140, identical with worm gears 132 and 136 and 133, and mounted upon the shaft of motor 101. The gear 139 is mounted upon a vertical shaft 141 upon the upper end of which is mounted a horizontal rod 142 composed of di-electric material which revolves horizontally as shaft 141 revolves. As the rod 142 turns, a brass contact 143 on one end comes in contact with a stationary contact 144 if a right turn is being made by the trailer, and a brass contact 145 on the other end of rod 142 comes in contact with a stationary contact 146. If a left turn is being made, rod 142 swings in the opposite direction and contact 143 comes in contact with a stationary contact 147, and contact 145 on the other end of rod 142 comes in contact with a stationary contact 148.

These stationary contacts 144, 146, 147 and 148 are vertically pivoted brass rods which are free to swing vertically upon their pivots, 149, and so permit rod 142 to swing horizontally in a wide arc without breaking contact with them. The contacts 143 and 145 on rod 142 are sufficiently long to remain in contact with the stationary contacts throughout its swing.

Contact 145 on one end of rod 142 is connected through a "pigtail" wire 150, which is also wound around the electromagnets 128 with the positive pole of battery 116. Contact 143 on the other end of rod 142 is connected to a "pigtail" coil on the end of insulated wire 94, through connecting plug 85—75 through insulated wire 84, to one pole of a switch 151 mounted conveniently to the driver upon the dash of the leading truck. The other pole of switch 151 is connected to insulated wire 83 which makes contact through connecting plug 75—85 with insulated wire 93, the other end of which is attached to the negative pole of battery 116.

Stationary contact 144 is connected by a wire 152 to brush binding post 118 of motor 101. Stationary contact 147 is connected by a wire 153 to brush binding post 120 of motor 101. Stationary contact 146 is connected by a wire 154 to brush binding post 120 of motor 101. Stationary contact 148 is connected by wire 156, with field coil binding post 126 and stationary contact 146 is also connected by wire 157 with field coil binding post 126, of motor 101. Stationary contact 144 is also connected by wire 158 with field coil binding post 123 and stationary contact 147 is also connected by wire 159, with field coil binding post 123. The stationary contacts are mounted so as to hang closely along the sides of, but not in contact with, the contacts 143 and 145 on the ends of rod 142, so that when the motor 101 revolves, turning the road wheels and swinging rod 142, through the worm gears 140 and 139, and the shaft 141 the contacts 143 and 145 will touch the stationary contacts 144 and 146 or 147 and 148, as soon as there has been any appreciable inclination from the straight ahead position of the road wheels.

The worm gears 140 and 139, 132 and 134, 133 and 135—which control the movement of the rod 142 and the left and right front road wheels of the trailer, respectively—are as accurately machined as possible.

When a turn is being made it is apparent that no current flows to the motor through the re-alignment apparatus, in spite of the fact that the contacts on the rod 142 are in contact with either stationary contacts 144 and 146 or 147 and 148, because the switch 151 on the dashboard of the leading truck is open. But the turn having been made and the driver wishing to correct any slight errors of alignment due to the limitations of mechanical accuracy and the limit of angular accuracy in the device, he closes the switch 151.

If any pair of front wheels have an inclination from the straight ahead position, their motor 101 receives current and revolves the wheels back toward the straight ahead position. When the straight ahead position is reached, the contacts 143 and 145 on rod 142 are no longer in contact with the stationary pairs of contacts 144 or 146 or 147 and 148, current ceases to flow and the motor stops. The driver then opens switch 151 and is ready for another turn. It is not contemplated that this procedure would be necessary except occasionally.

The flow of current through the re-alignment apparatus is as follows:—

If the wheels are inclined to the right—from the positive pole of battery 116 by wire 150, which coils around magnet 128, to the contact 145 on rod 142—thence to stationary contact 146—thence by wire 154 to brush binding post 120 on motor 101—thence through the armature windings of motor 101 to brush binding post 118 of motor 101—thence by wire 152 to stationary contact 144—thence to contact 143 on the other end of rod 142—thence by wire 94 to connecting plug 85—75—thence by wire 84 to switch 151 which has been closed—thence by wire 83 to connecting plug 75—85—thence by wire 93 to negative pole of battery 116. At the same time current flows through the field coils of motor 101 as follows:

From the positive pole of battery 116 by wire 150 to contact 145 on rod 142—thence to stationary contact 146, thence by wire 157 to field coil binding post 126 of motor 101—thence through the field coil windings of motor 101 to field coil binding post 123—thence by wire 158 to stationary contact 144—thence to contact 143 on rod 142—thence by wire 94 to connecting plug 85—75—thence by wire 84 to closed switch 151—thence by wire 83 to connecting plug 75—85—thence by wire 93 to negative pole of battery 116.

The magnet 128 is excited (wire 150 being wound around it) and draws plunger 129 away from spur gear 130 on shaft of motor 101—the motor 101 revolves and the road wheels swing to the left until the straight ahead position is reached—when contact between the contacts 143 and 146 on the rod 142 and the stationary contacts 144 and 146 is broken and the motor stops, and magnet 128 releases plunger 129 which is locked against gear 130 by spring 131.

If the inclination was to the left, the current through the field coils of motor 101 travels in the same direction except that it reaches field coil binding post 126 by way of stationary contact 148 and wire 156 instead of by way of stationary contact 146 and wire 157 as before. The current through the armature coils is reversed in case of a left inclination of the road wheels, as follows:

From positive pole of battery 116 by wire 150, around magnet 128, to contact 145 on rod 142—thence to stationary contact 148—thence by wire 155 to brush binding post 118 of motor 101—thence through the armature windings of motor 101 to brush binding post 120—thence by wire 153 to stationary contact 147—thence to contact 143 on rod 142—thence by wire 94 to connecting plug 85—75—thence by wire 84 to closed switch 151—thence by wire 83 to connecting plug 75—85—thence by wire 93 to negative pole of battery 116.

The motor revolves in reverse direction from that taken when the wheels were out of alignment on the right side, and swings the road wheels and rod 142 to the right until the straight ahead position is reached when the contacts 143 and 145 on rod 142 lose contact with the stationary contacts 147 and 148 and the circuit is broken, stopping and locking the motor. The driver then opens the switch 151.

When it is necessary to back or to steer a trailer by hand in maneuvering the trailer, the apparatus is disconnected from the road wheels by means of pivoted hand lever 160 mounted vertically in front of the driver which by means of a connecting link 161, moves another horizontally mounted rod 162. The lower end of rod 162 which is bent downward at right angles rest against bevel gear 4. The end of shaft 5 is squared and gear 4 is mounted by means of a square hole in its center upon the squared end of shaft 5. This squared end portion of shaft 5 is long enough to permit bevel gear 4 to slide upon it.

When the hand lever 160 is pulled back the action of connecting link 161 upon rod 162 causes the lower end of rod 162 to press against bevel gear 4 and force it out of mesh with bevel gear 2. A spiral spring 163 around shaft 5, one end of which bears against bevel gear 4 and the other end of which bears against a pin 164, which projects through a hole in shaft 5, resists the pressure of rod 162 and when that pressure is removed returns bevel gear 4 to mesh with bevel gear 2. A simple notch in the floor plate permits the hand lever 160 to be locked in pulled back position if desired. Another connecting link 165 pivoted to lower end of hand lever 160 and to the front end of a horizontal rod 166, forces the rear end of rod 166 which is bent at a right angle to the rest of lever 166, against the face of bevel gear 38 which is mounted by means of a square hole in its center upon the squared end of drum center wheel shaft 31. Bevel gear 38 slides upon shaft 31 against the tension of a spiral spring 167, one end of which bears against bevel gear 38 and the other against a pin 168, projecting from a hole in shaft 31.

The trailer may then be backed or steered by means of a hand tongue. When the hand lever 160 is released, bevel gear 4 and bevel gear 38 return to mesh with bevel gears 2 and 39 respectively through the action of springs 163 and 167.

The steering of the leading road wheels sets in motion a train of gears actuating a rack gear 13 and a long gear 20. Rack gear 13 moves backward or forward over a revolving recording drum which is revolved by a train of gears connected with the rear road wheels. Vertical rods 14 and 15 are suspended from rack gear 13 and have each a couple of rack gear teeth which thru the action of springs tend to mesh with long gear 20 with which they are always in contact as rack gear 13 moves forward or backward according to the direction in which the road wheels are steered.

The direction of revolution of long gear 20 also depends upon the direction in which the road wheels are steered—if to the right rod 14 is depressed and the rod 15 is lifted—if to the left vice versa. These rods have "fingers" upon their lower ends and the finger of the depressed rod meets contact strips 37 mounted upon the recording drum. These contact strips are obtuse angular in shape and physically and electrically in contact with one another.

Those contact strips meeting the finger of the depressed rod as rack gear 13, moves to and fro are revolved approximately one-quarter circle so that they point with their other ends toward the center of the drum—each circle of contact strips represents a one degree (1°) arc through which the road wheels may be steered. These are separate circles of contact strips for right turns and left turns—one hundred ten (110) circles for right turns and one hundred ten (110) circles for left turns.

The recording drum is so geared to the road wheels that when it has completed slightly less than one revolution the trailers front wheels will have reached the spot where the lead truck front wheels were when the turn was made. When this spot is reached, the contact strip which was turned inward by that change of direction will also have reached its contact plate upon the transmitting bar. (These transmitting bars 45 and 47 one for right turn contact strips and one for left turn contact strips, are arm like bars projecting through the open end rings of the recording drum, parallel to the axis of the drum. They have contact plates mounted upon them—one for each ring of contact strips—representing a one degree (1°) arc of turn. Each of these contact plates upon the transmitting bars is insulated from the others but comes into electrical contact with the inward turned contact strips 37 of its own particular ring of contact strips 37.) When the inward turned contact strip passes over its contact plate 46 or 48, it is revolved about one-quarter circle to its original position. At the same time an electric circuit is closed and current flows from the contact strip and contact plate through an insulated individual wire 49, or 50, (collected into cables 51 and 52), attached to the contact plate, to a magnet box where the individual insulated wire is coiled about a soft iron core to form an electro-magnet 54.

Leaving the coil, the individual wire is connected to a common wire which leads to one pole of a small storage battery 56; from the other pole of this battery 56 common wires lead to electric brushes in contact with the two end rings 33 and 34. This is the primary circuit—separate and distinct for each transmitting bar contact plate 46 or 48 (right and left) and magnet 54, but united in wire 55 for right turn magnets and in wire 59 for left turn magnets which lead to the common battery 56, and common wires 57 and 60 lead to the brushes 58 and 61, in contact with the end rings. The end rings and contact strips 37 are in common electrical contact. When the primary circuit is closed the magnet 54 involved attracts a soft iron plunger and pin upon which is mounted a contact plate 68, which when the plunger is drawn upward by the magnet comes in contact with a stationary contact plate 69. The secondary circuit is thereby closed through plates 68 and 69 from storage batteries 73 for right turn magnets 54 and 76 for left turn magnets 54. The magnet 54 now remains excited even after the primary circuit becomes open.

Insulated individual wires 78 for right and 79 for left turns, lead from plates 69 to coil around magnets 54 with the primary wires but insulated from them. Wires 78 and 79, collected into cables for convenience as they leave the magnet box lead to a connecting plug 75, where the individual wires 78 and 79 for the same one degree (1°) arc of turn are fastened to the same binding post. Wires 74 and 77 from the other poles of batteries 73 and 76 are fastened to separate binding posts in plug 75.

Connecting plug 85 unites plug 75 to the trailer leads. Individual insulated wires 90, which correspond to the various one degree arcs of turn, and are connected to the corresponding wires 78 and 79 from the magnet box, are gathered into a cable and lead to the regulating apparatus box mounted upon the trailer. Each wire 90 goes to an upper hinged plate 102 corresponding to the arc of turn. These upper plates are insulated from one another but are in electrical contact with lower hinged plates 103 which are in electrical contact with one another through the metal bottom of the regulating apparatus box. Wires 91 for right turns and 92 for left turns, lead from the bottom of the box and coil around soft iron cores to form electro-magnets 105 and 106 respectively.

From magnets 105 and 106, wires 91 and 92 lead to the connecting plug 85—75 where they connect to the leads 74 and 77 to the secondary storage batteries 73 and 76. Electro-magnets 105 and 106 which are excited by the current passing through the secondary circuit control a pivoted switch 107 which closes and opens a third circuit through a battery 116 and a motor 101.

When magnet 105 has been excited, a soft iron portion of switch 107 is attracted and electrical contacts thereby made which causes current from battery 116 to pass through motor 101 to revolve in such a direction that worm gears upon the shaft of motor 101 and in mesh with gears seated upon the pivot shaft about which the trailers front road wheels swing, steer the wheels to the right. When electro-magnet 106 is excited the opposite end of switch 107 is attracted and electrical contacts made, which cause the current from battery 116 to pass in an opposite direction through the armature coils of motor 101.

The revolution of motor 101 is thereby reversed, and through the worm gears on the shaft and wheel pivots the front wheels are steered to the left. While motor 101 is revolving, a worm gear 136 on its shaft, actuates, through a train of gears, the shaft 96 which passes through the vertical center of the regulating apparatus box. Mounted upon shaft 96 and at a right angle to it is a dielectric rod 97 which as shaft 96 revolves swings between the upper and lower hinged plates 102—103 and breaks the electrical contact between them.

When the last pair of plates thru which secondary current is passing are separated by rod 97 the secondary circuit is open, and the magnet 105 or 106 is de-magnetized, releasing switch 107 which is returned to neutral position by springs 138. The third circuit is now open—the motor 101 ceases to revolve and is locked by the release of plunger 129 by magnet 128 which is included in the third circuit.

While the foregoing specification sets forth the invention in specific terms, it is to be understood that numerous changes in the shape, size and materials may be resorted to without departing from the spirit and scope of the invention as claimed hereinafter.

It is also to be understood that the form of the invention illustrated in the foregoing specifications and accompanying drawings is only one of the forms of the invention and that other arrangements and applications of the invention and uses of the same may be applied without departing from the spirit of the invention or scope of the following claims and I intend to cover by my claims any modified form of structure or use or variation or equivalent, or substitution of other forms of energy.

It is to be understood further that the operation of a train of trailers or barges, automatically steered by means of this device, in conjunction with a "pusher" vehicle or with the aid of motorized trailers is contemplated as within the spirit and scope of my invention and the following claims. The use of the expression "preceding steerable wheels" in the following claims or the above specification refers to any steerable wheels preceding other steerable wheels, even though the latter are on a following vehicle.

The term "succeeding steerable wheels" refers to any steerable wheels preceded by other steerable wheels even though the latter belong to another vehicle.

Having thus described my invention, I claim:

1. In combination, a lead vehicle of the wheeled type, a trailer of the wheeled type, a recording apparatus on the lead vehicle for mechanically recording the motion of the steering wheels of the said vehicle, a wheel actuating apparatus on the trailer vehicle, and transmitting means between the recording apparatus and the actuating mechanism.

2. In combination, a lead vehicle, of the wheeled type, a trailer of the wheeled type, a recording apparatus of the lead vehicle for recording the motion of the steering wheels of the said vehicle, a wheel actuating apparatus on the trailer vehicle, transmitting means between the recording apparatus and the actuating mechanism, and re-aligning apparatus for the wheels of the trailer vehicle.

3. In combination, a lead vehicle, a trailer vehicle, electrical means between the lead and trailer vehicle for actuating the steerable wheels of the trailer, and means for delaying the action of the steerable wheels of the trailer vehicle in respect to the steerable wheels of the lead vehicle.

4. Automatic trailer train steering mechanism for transmitting motion from the steerable wheels of a lead vehicle to a trailer vehicle; a recording apparatus on a lead vehicle in connection with the steerable wheels thereof, wheel actuating apparatus on a trailer vehicle for actuating the steerable wheels thereof, transmitting apparatus between the recording apparatus of a lead vehicle and the actuating apparatus of a trailer vehicle, said recording apparatus including means for delaying the steering motion of the corresponding steerable wheels until the corresponding steerable wheels have reached a place on which the steerable wheels of the lead vehicle have turned.

5. Automatic means for controlling trailer vehicles drawn by a lead vehicle comprising a contactor adapted to be set in a given position in accordance with the position of the steerable wheels of the lead vehicle, a recording apparatus consisting of a multiplicity of contacts engageable by the said contactor, an electro-magnetic transmitting mechanism, each mechanism including a plurality of electro-magnets each in circuit with certain switches of the transmitting mechanism, and means for re-aligning the wheels of the trailer vehicle successively to correspond with the positions of the lead vehicle steerable wheels.

6. Means for controlling trailer vehicles drawn by a lead vehicle comprising a switching mechanism on the lead vehicle to be set by the usual steerable wheels thereof, and electro-magnetic means for steering trailing vehicles to which electrical energy is to be transmitted by the switching mechanism.

7. Means for controlling trailer vehicles drawn by a lead vehicle comprising a switching mechanism on the lead vehicle to be set by the usual steerable wheels thereof, electro-magnetic means to which electrical energy is to be transmitted by the switching mechanism, said switching mechanism consisting of a multiplicity of switches, said electro-magnetic means consisting of a multiplicity of electro-magnets controlled by the switches.

8. Means for controlling trailer vehicles drawn by a lead vehicle comprising a switching mechanism on the lead vehicle to be set by the usual steerable wheels thereof, electro-magnetic means to which electrical energy is to be transmitted by the switching mechanism, said switching mechanism consisting of a multiplicity of switches, said electro-magnetic means consisting of a multiplicity of electro-magnets controlled by said switches, means for actuating the electro-magnets to retard turning of the front wheels of the trailing vehicle until the front wheels of the trailing vehicle have reached the position on the ground upon which the steerable wheels of the preceding vehicle have turned.

9. In combination with wheeled vehicles, means for setting off on a recording apparatus the steering motion of leading steerable wheels, means for actuating steerable wheels following said leading steerable wheels, transmitting means between said recording apparatus and said actuating apparatus, means for controlling said recording apparatus so that it actuates the transmitting means so as to apply power to the actuating apparatus of the following steerable wheels at such a time as that said following steerable wheels have reached the place where said leading steerable wheels have turned.

10. In combination with wheeled vehicles, recording means, means for setting off the steering motion of leading steerable wheels of a vehicle on said recording means, actuating means for steering following steerable wheels, transmitting means between said recording means and said actuating means, means for controlling the recording means so that energy is applied to the transmitting means and steering means of the following steerable wheels at such time as that the following steerable wheels have reached the spot where the steering motion of the leading steerable wheels took place, and regulating means for immediately stopping the steering motion of the actuating means of the following steerable wheels as soon as they have turned in the same degree and direction as the leading steerable wheels were steered.

11. In combination with wheeled vehicles, means for recording the steering motion of leading steerable wheels, actuating apparatus for following steerable wheels, the recording apparatus and the actuating apparatus being connected by transmitting apparatus, and means for locking said actuating apparatus and following steerable wheels in position while not being steered.

12. In combination with wheeled vehicles, recording mechanism means for setting off the steering motion of leading steerable wheels, means for actuating trailing vehicle steerable wheels, transmitting means between said recording means and said actuating means, means for re-aligning trailing vehicle steerable wheels with the leading steerable wheels.

13. In combination, a preceding unit of a means of transportation towing a succeeding unit, an adjustable mechanism adapted to set off and record the varying steering motions of the preceding unit, means adapted to move the said adjustable mechanism in relation to the movement of the succeeding unit and its distance from the preceding unit so that those portions of said adjustable mechanism adjusted to correspond with the steering motions of the steerable member of the preceding unit actuates transmitting apparatus which is adapted to apply energy to means for actuating the steerable member of the succeeding unit, the time of such actuating coinciding with the arrival of the succeeding unit at the place where the steering motion of the preceding unit was initiated, the said actuating means being adapted to reproduce with the steerable member of the succeeding unit the previous steering motion of the preceding unit.

14. Automatic trailer train steering mechanism for transmitting motion from the steerable wheels of lead vehicles to successive trailer vehicles; recording mechanism on a lead vehicle in connection with the steerable wheels thereof, wheel actuating apparatus on said trailer vehicles for actuating the steerable wheels thereof, transmitting apparatus between the recording apparatus of the lead vehicle and the actuating apparatus of the successive trailer vehicles, said actuating apparatus including means for delaying the steering motion of the corresponding steerable wheels until the wheels have reached a place on which the steerable wheels of the succeeding vehicle have turned and realigning means on each of the trailer vehicles for resetting the steerable wheels to conform with the position of the lead vehicle steerable wheels.

In testimony whereof I affix my signature.

WILLIAM P. PINCKARD.